(12) United States Patent
Zennaro et al.

(10) Patent No.: US 8,868,522 B1
(45) Date of Patent: Oct. 21, 2014

(54) UPDATING GEOGRAPHIC DATA BASED ON A TRANSACTION

(71) Applicant: Google Inc., Mountain View, CA (US)

(72) Inventors: Marco Zennaro, San Francisco, CA (US); Kong Man Cheung, San Francisco, CA (US); Julian Ibarz, San Francisco, CA (US); Liron Yatziv, Sunnyvale, CA (US); Sacha Christophe Arnoud, San Francisco, CA (US)

(73) Assignee: Google Inc., Mountain View, CA (US)

( * ) Notice: Subject to any disclaimer, the term of this patent is extended or adjusted under 35 U.S.C. 154(b) by 145 days.

(21) Appl. No.: 13/691,532

(22) Filed: Nov. 30, 2012

(51) Int. Cl.
*G06F 17/30* (2006.01)
(52) U.S. Cl.
CPC .................... *G06F 17/3007* (2013.01)
USPC .......................................... 707/694
(58) Field of Classification Search
USPC ......... 707/648, 682, 694–696, 701–704, 725, 707/737–740, 758–760
See application file for complete search history.

(56) References Cited

U.S. PATENT DOCUMENTS

| | | | |
|---|---|---|---|
| 2004/0030626 A1* | 2/2004 | Libman | 705/36 |
| 2006/0253590 A1* | 11/2006 | Nagy et al. | 709/226 |
| 2011/0004830 A1* | 1/2011 | Von Kaenel et al. | 715/751 |
| 2011/0287748 A1* | 11/2011 | Angel et al. | 455/414.1 |

\* cited by examiner

*Primary Examiner* — Wilson Lee
(74) *Attorney, Agent, or Firm* — McDermott Will & Emery LLP

(57) ABSTRACT

Systems and methods for updating geographic data based on a transaction are provided. In some aspects, one or more transaction records associated with a business are accessed from a memory. Each transaction record identifies a transaction time, geographic location data, and transaction information. A geocoded record of the business is selected to update, based on the geographic location data of the one or more transaction records. The selected geocoded record is updated based on at least one of the transaction time or the transaction information identified in the transaction records.

20 Claims, 6 Drawing Sheets

UPDATING GEOGRAPHIC DATA BASED ON A TRANSACTION

BACKGROUND

The subject technology generally relates geographic interfaces and, in particular, relates a updating geographic data based on a transaction.

Data repositories that store geographic information about businesses are used in conjunction with mapping services. In some cases, a data repository for a mapping service stores business names in conjunction with geographic locations. Oftentimes, old businesses close, new businesses open, or existing businesses change their names or addresses. In such circumstances, the businesses typically do not notify the mapping service about the change, thus rendering the information of the mapping service inaccurate and obsolete.

SUMMARY

In some aspects, the disclosed subject matter relates to a system. The system includes processing hardware and a memory. The processing hardware is configured to access, from the memory, one or more transaction records associated with a business. Each transaction record identifies a transaction time, geographic location data, and transaction information. The processing hardware is configured to select a geocoded record of the business to update, based on the geographic location data of the one or more transaction records. The processing hardware is configured to update the selected geocoded record based on at least one of the transaction time or the transaction information identified in the transaction records.

In some aspects, the disclosed subject matter relates to a computer-implemented method for updating geographic data based on a transaction. The method includes accessing, from a data repository, one or more transaction records. Each transaction record identifies a transaction time, geographic location data, and transaction information. The method includes identifying a cluster of transaction records having geographic location data corresponding to a particular geographic area. The method includes creating a geocoded record of a business based on the cluster. The method includes using at least one of the transaction time or the transaction information identified in the transaction records to populate the created geocoded record.

In some aspects, the disclosed subject matter relates to a computer-readable medium encoded with executable instructions. The instructions include code for receiving a transaction record. The transaction record identifies a transaction time, geographic location data, and transaction information. The instructions include code for associating the transaction record with a geocoded record stored in a geographic data repository based on the geographic location data in the transaction record. The instructions include code for updating the geocoded record based on at least one of the transaction time or the transaction information.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

Figure 1:
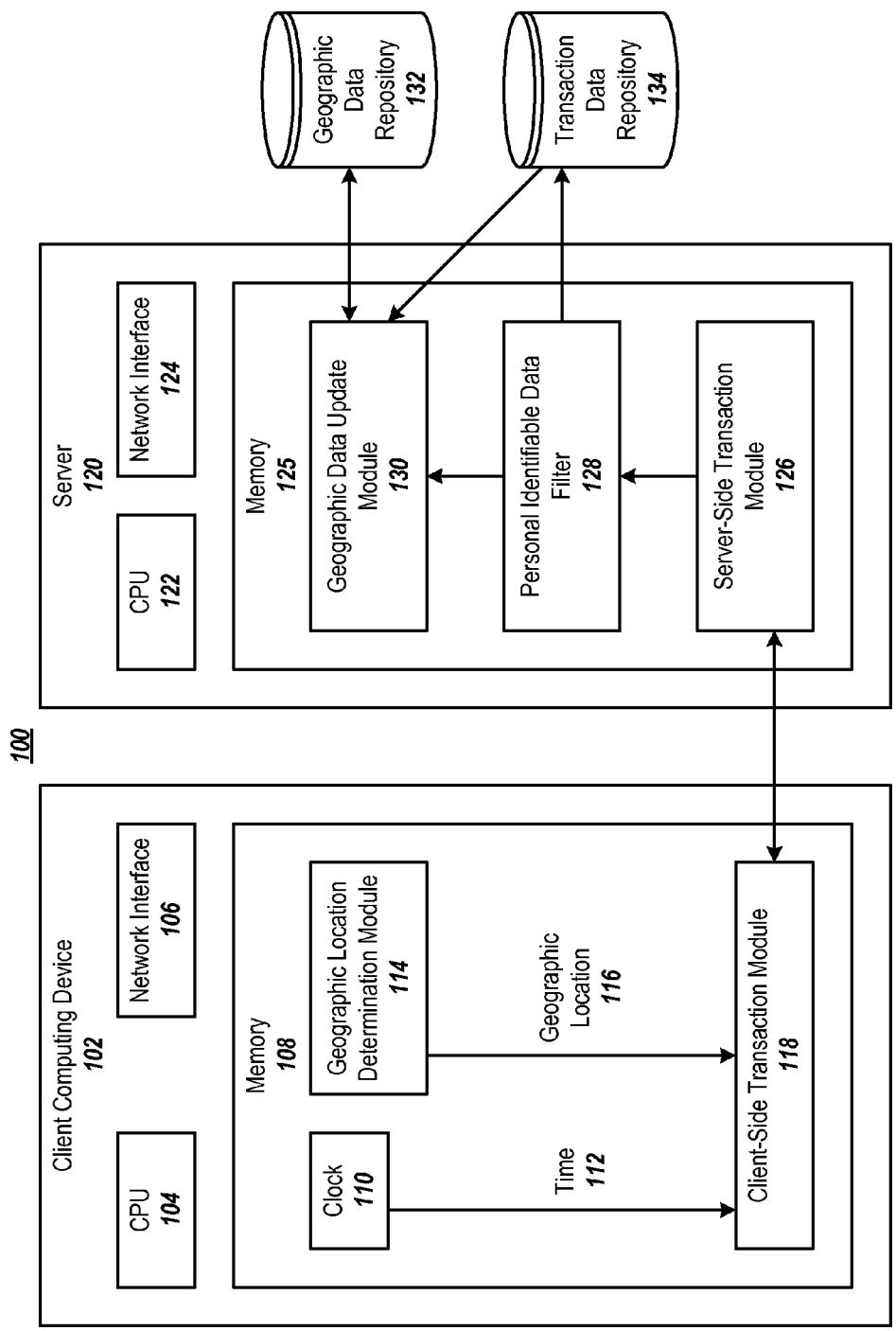
FIG. 1 illustrates an example of a system for updating a geographic data repository based on transaction data.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As set forth above, data repositories for mapping services that store geographic information about businesses sometimes need to be updated. However, acquiring updated information for the data repositories may be challenging or expensive, for example, requiring a human operator to visit geographic locations and verify that businesses still exist. Furthermore, users of the mapping service may desire information about a business in addition to the name and the geographic location of the business, for example, the hours of operation of the business. As the foregoing illustrates, approaches for updating and adding information to data repositories associated with mapping services may be desirable.

The subject technology provides, among other things, techniques for updating geographic data in a mapping service based on end-consumer financial transaction(s) made via a mobile device. In some aspects a server accesses, from a memory (e.g., a data repository), one or multiple transaction records (e.g., records of purchases, receipts, or uses of coupons) associated with a business (e.g., ABC Café). Each transaction record identifies a transaction time (e.g., 8 AM on Aug. 1, 2012), geographic location data (e.g., a geographic location of a mobile device associated with the transaction at the transaction time), and transaction information (e.g., business name, business address, price, etc.). The server selects a geocoded record of a business (e.g., the record of ABC Café in a geographic data repository for a mapping service) to update. The geocoded record of the business is selected based on the geographic location data of the one or multiple transaction records. For example, if a bookstore has two locations, one in San Francisco and another in Los Angeles, transaction records created in San Francisco are likely to pertain to the San Francisco location of the bookstore. The server updates the selected geocoded record based on the transaction time or the transaction information identified in the transaction records. For example, if a business engages in multiple transactions between 9 AM and 5 PM but no transactions outside those hours, the operating hours of the business are likely 9 AM through 5 PM. Alternatively, the transaction information can include a business address that is more accurate than a business address previously stored in the geographic data repository.

FIG. 1 illustrates an example system 100 for updating a geographic data repository 132 based on transaction data.

As shown, the system 100 includes a client computing device 102, a server 120, a geographic data repository 132, and a transaction data repository 134.

The client computing device 102 may be a mobile phone, a personal digital assistant (PDA), a personal digital music player, a tablet computer, or a laptop computer, etc. The client computing device 102 may be a mobile device. The client computing device 102 may be a computing device of a buyer in a transaction (e.g., an end-customer's computing device) or a computing device of a seller in the transaction (e.g., a computing device operated by a seller that includes an input for cash, credit cards, or coupons). In some examples, the computing device of the seller in the transaction is a point of sale terminal.

As shown, the client computing device 102 includes a central processing unit (CPU) 104, a network interface 106, and a memory 108. The CPU 104 may include one or more processors. The CPU 104 is configured to execute computer instructions that are stored in a computer-readable medium, for example, the memory 108. The network interface 106 is configured to allow the client computing device 102 to transmit and receive data in a network, e.g., to communicate with the server 120. The network interface 106 may include one or more network interface cards (NICs). The memory 108 stores data or instructions. The memory 108 may be one or more of a cache unit, a storage unit, an internal memory unit, or an external memory unit. As illustrated, the memory 108 includes a clock 110, a geographic location determination module 114, and a client-side transaction module 118.

The clock 110 is configured to determine the time 112 and to provide the time 112 to the client side transaction module 118. The clock 110 may be implemented via a local timekeeping device on the client computing device 102 or a clock 110 that receives the current time via the Internet, via a cellular network, or via global positioning system (GPS) satellite(s). As shown, the clock 110 that associates the transaction with the time 112 resides on the client computing device 102. However, in some implementations the clock that associates the transaction with the time may reside on the server 120, in the transaction data repository 134, or in another machine (e.g., a network timekeeping device). In some aspects, the time 112 may be associated with the transaction at the server 120 based on a clock residing on the server 120 or based on a network clock.

The geographic location determination module 114 is configured to determine a current geographic location 116 of the client computing device 102 based on one or more GPS signal(s), WiFi signal(s), or cellular signal(s). The geographic location determination module 114 transmits the determined geographic location 116 to the client-side transaction module 118. The geographic location determination module 114 operates in conjunction with permission from the user to determine the geographic location of the client computing device. The geographic location determination module 114 provides a user interface element (e.g., a blue dot or a toolbar indicating that geographic location determination is enabled) to notify the user that his/her geographic location is being determined. In addition, the geographic location determination module 114 may provide electronic messages to the user (e.g., via email or via the application) to inform the user that his/her geographic location is being determined. The messages may be provided once every threshold number of logins to an application (e.g., once every ten logins) or once every threshold time period (e.g., once every thirty days). The geographic location of a mobile device is not determined without the consent of the user. The user affirmatively provides his/her consent and may withdraw or revoke his/her consent at any time.

The client-side transaction module 118 is configured to facilitate the client computing device 102 engaging in a transaction, for example, a business or financial transaction by an end-consumer who owns or uses the client computing device 102. The transaction may be a purchase (e.g., a mobile phone based purchase using a financial account, e.g., a bank account or a store credit account, coupled with the mobile phone or a financial account whose information is temporarily provided to the mobile phone) or a redemption of a promotional offer (e.g., using a coupon stored on the client computing device). In order to carry out the transaction, the client-side transaction module 118 communicates information, including the time 112 and the geographic location 116 of the client computing device 102 to a server-side transaction module 126 residing on the server 120. The user affirmatively provides his/her consent for the client-side transaction module 118 to communicate the geographic location 116 of the user to the server 120, and the user may withdraw or revoke his/her consent at any time. Transaction data of the user of the client computing device 102 is not used by the server 120 without the permission of the user. The transaction data is transmitted from the client computing device 102 to the server 120 after the user of the client computing device 120 has affirmatively provides consent for the transmission. The user can withdraw or revoke consent for the use of the user's transaction data by the server 120 or the data repositories 132 or 134 at any time.

A transaction, processed by the client-side transaction module, may be initiated on the client computing device 102 by one or more of instantiating an application and entering a request for a transaction, scanning a near-field communication (NFC) reader while running the application, scanning a quick response (QR) code while running the application, or providing an input (e.g., a scan of a credit card, an entry of a price, a selection of a bank account for a payment, an entry of a coupon code, a scan of a coupon, etc.) to the application.

The server 120 may be implemented as a single machine, multiple machines, or a server farm. As shown, the server 120 includes a central processing unit (CPU) 122, a network interface 124, and a memory 125. The CPU 122 may include one or more processors. The CPU 122 is configured to execute computer instructions that are stored in a computer-readable medium, for example, the memory 125. The network interface 124 is configured to allow the server 120 to transmit and receive data in a network, e.g., to communicate with the client computing device 102 or the data repositories 132 or 134. The network interface 124 may include one or more network interface cards (NICs). The memory 126 stores data or instructions. The memory 125 may be one or more of a cache unit, a storage unit, an internal memory unit, or an external memory unit. As illustrated, the memory 125 includes the server-side transaction module 126, a personal identifiable data filter 128, and a geographic data update module 130.

The server-side transaction module 126 is configured to receive a transaction request, including the time 112 and the geographic location 116, from the client computing device 102. Alternatively, the time 112 may be determined locally on the server 120, e.g., via a clock residing on the server 120 or a network clock. In response to the transaction request, in some implementations, the server may verify additional information (e.g., that a bank account is authorized for a charge, that a coupon code is valid, etc.) and carry out the requested transaction. In some implementations, e.g., transactions involving scanning a coupon for a purchase for which a customer pays cash, the server may not need to verify additional information. Upon carrying out a transaction, the server-side transaction module 126 generates a transaction record and provides an indication of the transaction record to all parties in the transaction (e.g., the buyer or the seller, one of which may be the operator of the client computing device 102. The transaction record includes a transaction time (time 112), geographic location data (geographic location 116), and transaction information (e.g., purchase of cup of coffee for $2 at ABC Café, having a business address of 123 Main Street). The transaction record is provided to the personal identifiable data filter 128.

The personal identifiable data filter 128 is configured to remove personal identifiable data from transaction record(s), so the transaction record(s) can be used to update data on the server 120 without infringing of the privacy of the participants in the transaction(s) or the user(s) of the client computing device 102. The personal identifiable data filter 128 may be configured to remove name(s), user identifier(s), financial account information, and any other information that uniquely identifies user(s) from the transaction record(s). After removing the personal identifiable information, the personal identifiable data filter 128 forwards transaction record(s) to the geographic data update module 130 and/or for storage in a transaction data repository 134 for future analysis.

The geographic data update module 130 is configured to access one or multiple of transaction records (from the personal identifiable data filter 128 or from the transaction data repository 134). The transaction records accessible to the geographic data update module 130 lack personal identifiable data (e.g., name(s), user identifier(s), or financial account information). Each transaction record identifies a transaction time, geographic location data, and transaction information. The data identified in the transaction records—transaction time, geographic location data, and transaction information—are anonymized (e.g., via operation of the personal identifiable data filter 128) and cannot be associated with individual users.

The geographic data update module 130 is configured to select a geocoded record of a business (e.g., stored in the geographic data repository 132) to update based on the geographic location data of the one or multiple transaction records. For example, if a transaction record indicates that the transaction took place at a certain geographic location, the transaction was likely with a business located within a threshold radius (e.g., 50 meters) of the geographic location at the time of the transaction. The geocoded record may correspond to a business about which information is stored in a mapping service corresponding to the geographic data repository 132. For example, the geographic data repository may store the ABC Café is located at 123 Main Street. The geographic data update module 130 is configured to use at least one of the transaction time or the transaction information identified in the transaction records to update the selected geocoded record (e.g., the record about ABC Café).

In some aspects, a geocoded record includes an indication of a geographic location and a place name. For example, a geographic location could be a street address, a latitude and longitude or an indication of a geographic region that spans an area (e.g., the City of San Francisco, Central Park in New York City, etc.). The place name could be the name of a business or an other entity located at the geographic location. Example place names include "ABC Café," "DEF Bookstore," "San Francisco Museum of Modern Art," "Central Park," "San Francisco," and "Yankee Stadium." A geocoded record can also include additional information, for example, the hours of a business at the geographic location or a photograph of the geographic location.

In some aspects, the geographic data update module 130 determines a pattern of transaction times and, based on the pattern, infers the business hours of the business. For example, if purchases at ABC Café take place between 8 AM and 5 PM, but not during other hours, the business hours of ABC Café may be inferred to bet between 8 AM and 5 PM.

In some aspects, the geographic data update module 130 determines a pattern of transaction times and, based on identifying a drop in the pattern, infers that the business is closed. For example, if ABC Café has an average of 20 transactions per day during a six month period, followed by a six month period with no transactions at all, the geographic data update module 130 may infer that ABC Café is closed. Whether ABC Café is really closed may be verified by having an operator visit or contact ABC Café.

In some aspects, the geographic data update module 130 verifies an address of the business based on the payment information associated with the purchase. The address for the business stored in the geocoded record in the geographic data repository 132 may be corrected or updated based on the payment information.

In some aspects, a business may engage in transactions in multiple different geographic locations. For example, XYZ Taco Truck may engage in transactions in the SOMA District of San Francisco on Monday, in the Sunset District of San Francisco on Tuesday, and in the Marina District of San Francisco on Wednesday. Based on the fact that XYZ Taco Truck engaged in transactions in multiple different geographic locations, the geographic data update module 130 may determine that XYZ Taco Truck is a mobile business and store an indication that XYZ Taco Truck is a mobile business in the record for XYZ Taco Truck in the geographic data repository 132. The geographic data repository 132 may also store a set of past locations for XYZ Taco Truck. The server 120 may further predict a current or future geographic location for XYZ Taco Truck based on the set of past geographic locations. For example, if XYZ Taco Truck engaged in geographic transactions in the SOMA District during the last ten Mondays, the server 120 may determine that XYZ Taco Truck is likely to be in the SOMA District next Monday. An owner, operator, or other agent of XYZ Taco Truck can opt-out of having the server 120 store or predict past, present, or future geographic locations of XYZ Taco Truck or affirmatively opts in to having such information stored.

In some aspects, the geographic data update module 130 generates a business geocode or an association between a business and a particular geographic location, a list or set of "open business" where at least a threshold number of transactions (e.g., 1, 5, or 10 transactions) were conducted within a threshold time period (e.g., one week, two weeks, one month, etc.) before a current time, or a list or set of "possibly closed businesses" where transactions (that are accessible to the server 120) have not been conducted within the threshold time period.

The transaction data repository 134 may be implemented as a database or any other data repository. The transaction data repository is configured to store transaction records that include a transaction time (time 112), geographic location data (geographic location 116), and transaction information. The transactions in the transaction data repository 134 are anonymized and do not include personal identifiable information due to the operation of the personal identifiable data filter 128.

The geographic data repository 132 may be implemented as a database or any other data repository. The geographic data repository 132 is configured to store geocoded records. Each geocoded record is associated with a geographic location and point(s) of interest at the geographic location. A geographic location may be represented, for example, as a latitude and longitude or as a street address. The point(s) of interest may include, for example, one or more of a business, a government building, a park, a landmark, etc. Geocoded records that correspond to businesses may, in some cases, include additional information about the business, for example, a business name, business hours, a business telephone number, a manager name, etc.

Figure 2:
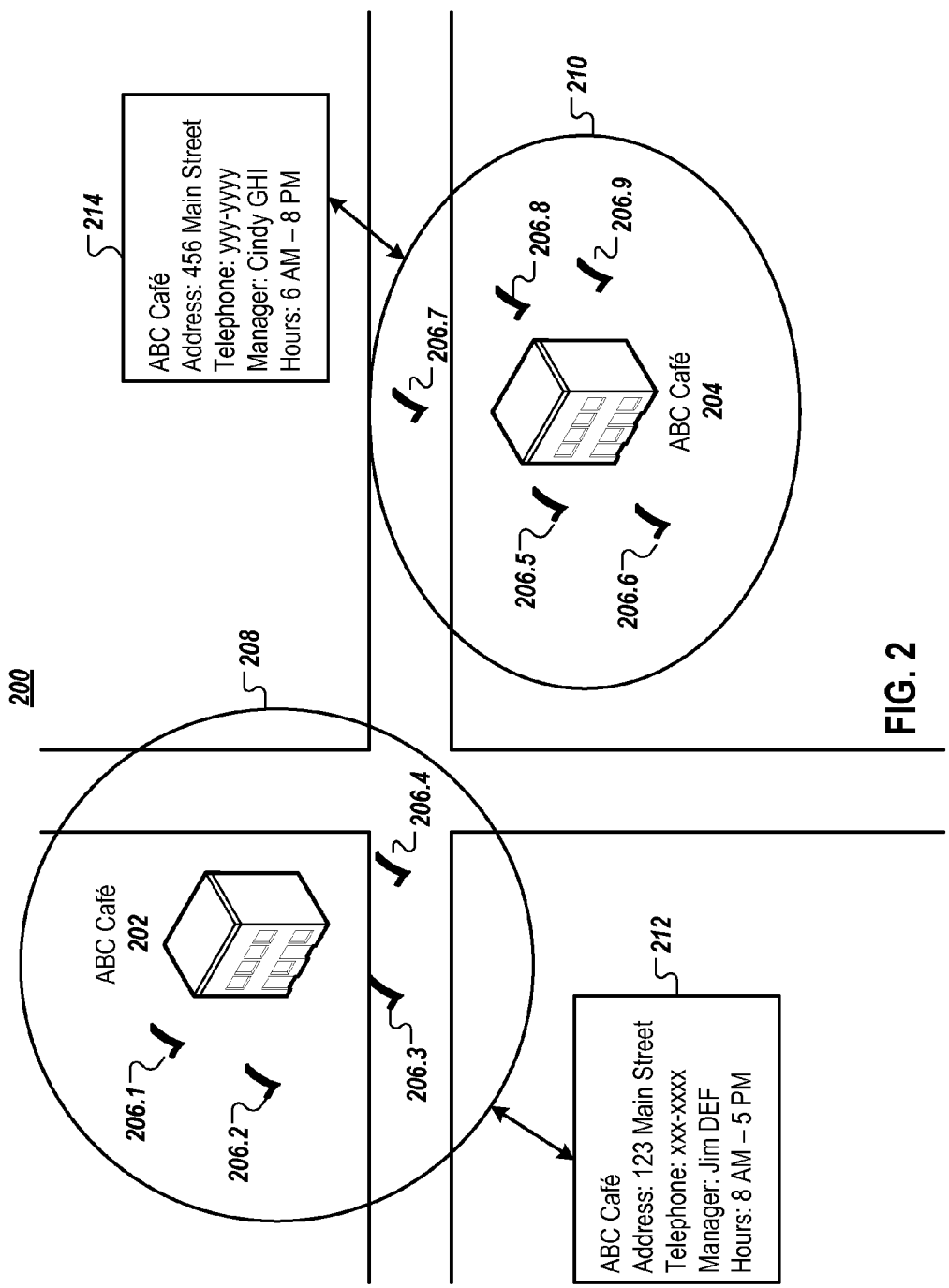
FIG. 2 illustrates an example map of businesses and geographic locations of transactions.

FIG. 2 illustrates an example map 200 of businesses 202 and 204 and geographic locations of transactions 206 (indicated by check marks).

As illustrated in FIG. 2, ABC Café has two shops 202 and 204 in the geographic region covered by the map 200. The map 200 also indicates transactions 206.1-9 that took place with ABC Café. Transactions 206.1-4 (in region 208) may be associated with ABC Café 202 because they are closer to ABC Café 202 than to ABC Café 204. Transactions 206.5-9 (in region 210) may be associated with ABC Café 204 because they are closer to ABC Café 204 than to ABC Café 202. Transactions may be indicated in slightly inaccurate locations (e.g., within 10, 50, or 100 meters of the actual location) due to inaccuracies or errors of geographic location determination technology of mobile devices.

The transactions 206 may be used to determine additional information about the ABC Cafes 202 and 204, for example, based on the records for the transactions 206. As shown, transactions 206.1-4 are associated with information 212, which includes a street address, a telephone number, a manager name, and business hours. This information 212 may be coupled with a record for ABC Café 202 in the geographic data repository 132. Similarly, transactions 206.5-9 are associated with information 214, which includes a street address, a telephone number, a manager name, and business hours. This information 214 may be coupled with a record for ABC Café 204 in the geographic data repository 132. The information 212 and 214 for the transactions 206.1-4 and 206.5-9, respectively, may be provided to participants in the transactions 206, for example, in conjunction with a receipt for the transactions 206.

Figure 3:
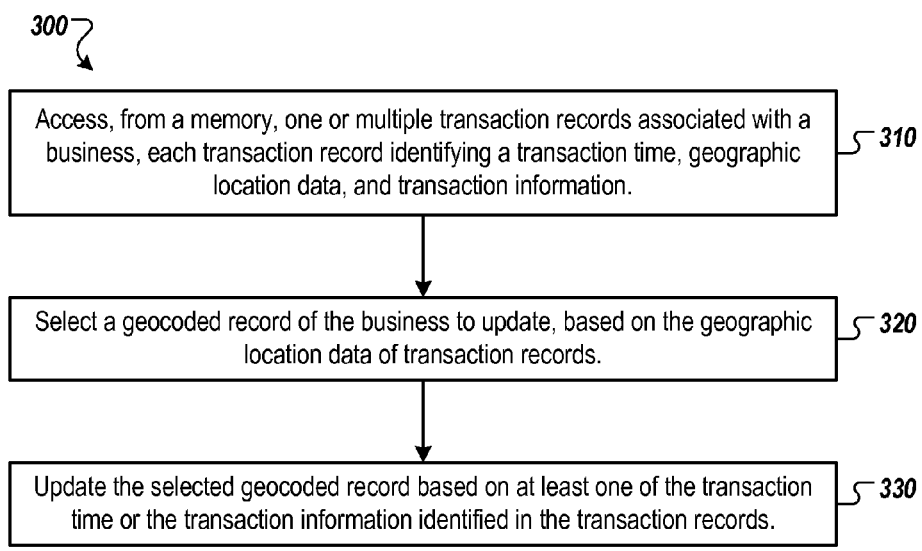
FIG. 3 illustrates an example process by which a geocoded record may be updated based on transaction records.

FIG. 3 illustrates an example process 300 by which a geocoded record may be updated based on transaction records.

The process 300 begins at step 310, where a server (e.g., the server 120) accesses, from a memory (e.g., the memory 125 of the server 120, the output of the personal identifiable data filter 128, or the transaction data repository 134) one or multiple transaction records associated with a business (e.g., ABC Café). The server may receive all or a portion of the transaction records from a transaction data repository. Alternatively, the server may receive all or a portion of the transaction records from a plurality of mobile devices which are used to carry out transactions. A mobile device can be a mobile device of an end-consumer, which may be tapped to a NFC reader of a business to notify the business of the consumer's payment information, or a mobile device of a business, which may include a credit card scanner and/or be configured to provide electronic receipts. Before accessing the transaction information, the server filters personal identifiable information (e.g., user names, payment account information, mobile device identifier information, etc.) from the transaction records received from the mobile devices or the server verifies that the personal identifiable information has already been filtered.

Each transaction record identifies a transaction time, geographic location data, and transaction information. A transaction record can be, for example, a purchase record, a record of a use of coupon, or a record of a redemption of a promotional offer. The transaction can be a transaction with an offline business, for example, a brick-and-mortar business (e.g., a local bookstore) or a mobile business (e.g., a food truck or a travelling salesperson).

In step 320, the server selects (e.g., from the geographic data repository 132) a geocoded record of the business to update based on the geographic location data of the transaction records. For example, the server could select a business having a name corresponding to the business name in the geocoded records and having a stored (e.g., in the geographic data repository 130) geographic location within a threshold distance (e.g., 25, 50, or 100 meters) of the geographic location of the transaction records.

In step 330, the server updates the selected geocoded record based on at least one of the transaction time or the transaction information identified in the transaction records.

For example, the server determines a pattern of transaction times (e.g., transactions occur on weekdays between 8 AM and 5 PM and on weekends between 10 AM and 4 PM) and, based on the pattern, the server infers business hours (e.g., weekdays between 8 AM and 5 PM and weekends between 10 AM and 4 PM) associated with the business. Alternatively, the server identifies a drop in the pattern (e.g., transactions take place every day before Jan. 1, 2012, and stop taking place after Jan. 1, 2012) and, based on the drop in the pattern, the server infers that the business is closed.

In some aspects, the transaction (e.g., purchase) record can include payment information (e.g., a receipt) that includes an address of the business (e.g., 123 Main Street). The server can update the geocoded record to include the address of the business or to correct an existing address of the business previously in the geocoded record (e.g., the geocoded record may have incorrectly listed the address of the business as 125 Main Street rather than 123 Main Street).

In other aspects, updating the geocoded record includes determining, based on the geographic location data of the one or multiple transaction records, that the business is a mobile business. For example an ice cream truck can be located in a residential area at 10 AM, at a playground at 2 PM, and adjacent to a diner at 6 PM. The server can store an indication that the business is a mobile business in the geocoded record. With appropriate permissions from the owner of the mobile business, the server can also store, in conjunction with the geocoded record, an indication of a set of past geographic locations and, in some cases, associated times, for the business. The server can also predict a future geographic location for the business based on the set of past geographic locations for the business. For example, if the ice cream truck is at the playground at 2 PM every day, the server can predict that the ice cream truck will be at the playground at 2 PM on a given day. After step 330, the process 300 ends.

Figure 4:
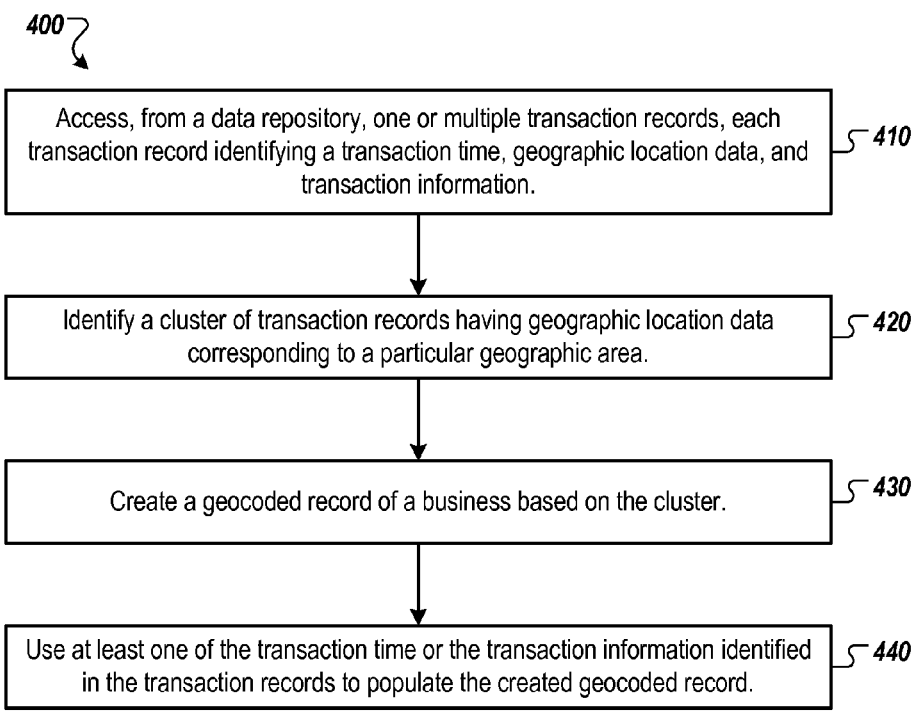
FIG. 4 illustrates an example process by which a geocoded record may be created based on transaction records.

FIG. 4 illustrates an example process 400 by which a geocoded record may be created based on transaction records.

In step 410, a server (e.g., the server 120) accesses, from a data repository (e.g., transaction data repository 134) one or multiple transaction records. Each transaction record identifies a transaction time, geographic location data, and transaction information.

In step 420, the server identifies a cluster of transaction records having geographic location data corresponding to a particular geographic area. The particular geographic area can be a circular geographic area (e.g., geographic area 208 of FIG. 2) defined by a center point and a predetermined radius, an elliptical geographic area (e.g., geographic area 210 of FIG. 2) or any other geographic area. For example, a geographic area corresponding to a superstore can be a 250 meter by 200 meter rectangular region.

In step 430, the server creates a geocoded record of a business based on the cluster. For example, the cluster of transaction records can indicate that the transactions were with GHI Superstore, and the server can infer that GHI Superstore is located in the particular geographic area.

In step 440, the server uses at least one of the transaction time or the transaction information identified in the transaction records to populate the created geocoded record. For example, the server could add additional information to the created geocoded record based on the transaction time or the transaction information. After step 440, the process 400 ends.

Figure 5:
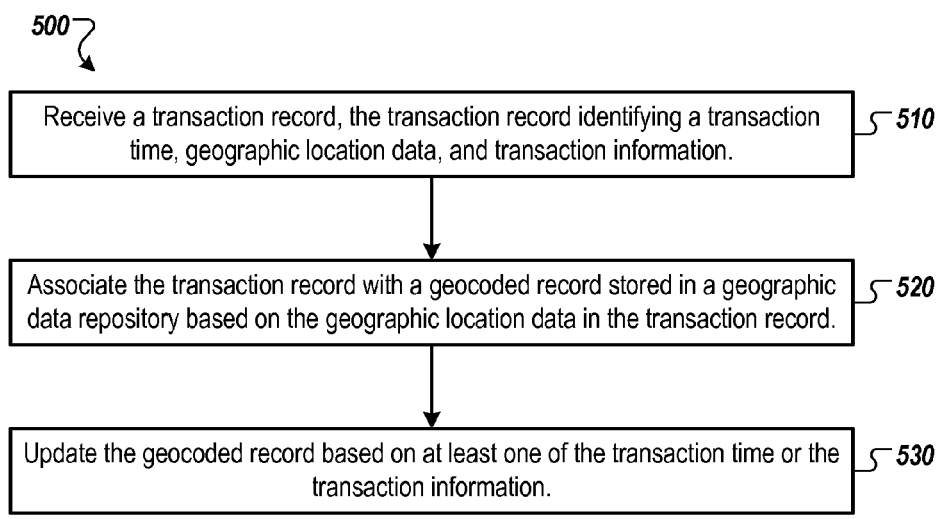
FIG. 5 illustrates an example process by which a geocoded record may be updated based on a transaction record.

FIG. 5 illustrates an example process 500 by which a geocoded record may be updated based on a transaction record.

The process 500 begins at step 510, where a server (e.g., the server 120) receives a transaction record. The transaction record identifies a transaction time, geographic location data, and transaction information. Personal identifiable information is removed from the transaction record by the server (e.g., via operation of the personal identifiable data filter 128) or by another machine before providing the transaction record to the server. The transaction record could be a purchase record, a record of a redemption of a promotional offer, or a record of a use of a coupon.

In step 520, the server associates the transaction record with a geocoded record stored in a geographic data repository (e.g., the geographic data repository 132) based on the geographic location data in the transaction record. The geocoded record may be associated with a business.

In step 530, the server updates the geocoded record based on at least one of the transaction time or the transaction information. For example, the server determines an address of the business based on payment information associated with the transaction record. The server updates the geocoded record to include the address of the business or to correct an existing address of the business previously in the geocoded record. After step 530, the process 500 ends.

Aspects of the subject technology involve determining geographic location(s) of a mobile device when a transaction is entered via the mobile device, and transmitting the determined geographic location(s) to a server. The determinations of geographic location are known to the user and described in contextual notices provide to the user in plain language, for example, when the user downloads or executes an application. Furthermore, persistent reminders are provided in the user interface of the mobile device that the geographic location is being determined and transmitted. In some aspects, periodic reminders are provided to the user when the user logs into an application (e.g., every tenth login or every thirty days) or electronic messages (e.g., email) are provided to the user to remind him/her of the determinations of the geographic location. The user explicitly and affirmatively provides consent to having the geographic location of his/her mobile device determined and may easily withdraw or revoke such consent at any time via the user interface of the mobile device. Furthermore, the user may remove any geographic location information associated with the mobile device of the user stored by the service (e.g., in a data repository or a server), and location data can be anonymized so as not to be associated with any specific user or mobile device. In some aspects, a privacy dashboard is provided via the mobile device that allows the user to determine which information about his/her current or past geographic locations is stored by the service or by the mobile device or to remove such information from the service or from the mobile device. Furthermore, all geographic location information is encrypted when transmitted over a network to prevent unauthorized access to the geographic location information.

Figure 6:
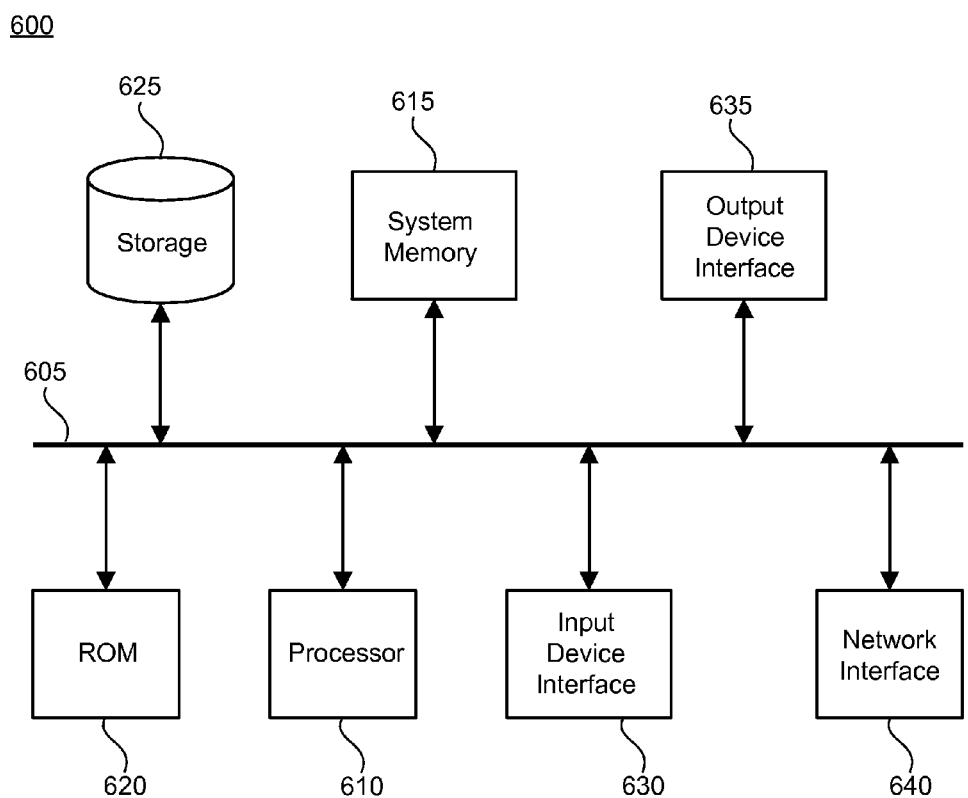
FIG. 6 conceptually illustrates an example electronic system with which some implementations of the subject technology are implemented.

FIG. 6 conceptually illustrates an electronic system 600 with which some implementations of the subject technology are implemented. For example, one or more of the transaction data repository 134, the geographic data repository 132, the server 120, or the client computing device 102 may be implemented using the arrangement of the electronic system 600. The electronic system 600 can be a computer (e.g., a mobile phone, PDA), or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some implementations of the subject technology use a mass-storage device (for example a magnetic or optical disk and its corresponding disk drive) as the permanent storage device 625.

Other implementations use a removable storage device (for example a floppy disk, flash drive, and its corresponding disk drive) as the permanent storage device 625. Like the permanent storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the processes of the subject technology are stored in the system memory 615, the permanent storage device 625, or the read-only memory 620. For example, the various memory units include instructions for updating geographic data based on a transaction in accordance with some implementations. From these various memory units, the processing unit(s) 610 retrieves instructions to execute and data to process in order to execute the processes of some implementations.

The bus 605 also connects to the input and output device interfaces 630 and 635. The input device interface 630 enables the user to communicate information and select commands to the electronic system. Input devices used with input device interface 630 include, for example, alphanumeric keyboards and pointing devices (also called "cursor control devices"). Output device interfaces 635 enables, for example, the display of images generated by the electronic system 600. Output devices used with output device interface 635 include, for example, printers and display devices, for example cathode ray tubes (CRT) or liquid crystal displays (LCD). Some implementations include devices for example a touchscreen that functions as both input and output devices.

Finally, as shown in FIG. 6, bus 605 also couples electronic system 600 to a network (not shown) through a network interface 640. In this manner, the electronic system 600 can be a part of a network of computers (for example a local area network ("LAN"), a wide area network ("WAN"), or an Intranet, or a network of networks, for example the Internet. Any or all components of electronic system 600 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A system, comprising:
processing hardware; and
a memory,
the processing hardware configured to:
   access, from the memory, one or more transaction records associated with a business, each transaction record identifying a transaction time, geographic location data, and transaction information;
   select a geocoded record of the business to update, based on the geographic location data of the one or more transaction records; and
   update the selected geocoded record based on at least one of the transaction time or the transaction information identified in the transaction records.

2. The system of claim 1, wherein updating the geocoded record of the business comprises:
determining a pattern of the transaction times and, based on the pattern, inferring business hours associated with the business.

3. The system of claim 1, wherein updating the geocoded record of the business comprises:
determining a pattern of the transaction times and, based on identifying a drop in the pattern, inferring that the business is closed.

4. The system of claim 1, wherein the transaction record comprises a purchase record.

5. The system of claim 4, wherein updating the geocoded record comprises:
determining an address of the business based on payment information associated with the purchase; and
updating the geocoded record to include the address of the business or to correct an existing address of the business previously in the geocoded record.

6. The system of claim 4, wherein updating the geocoded record comprises:
determining, based on the geographic location data of the one or more transaction records, that the business is a mobile business; and
storing an indication that the business is the mobile business in the geocoded record.

7. The system of claim 6, wherein updating the geocoded record further comprises:
storing, in conjunction with the geocoded record, an indication of a set of past geographic locations for the business.

8. The system of claim 7, wherein updating the geocoded record further comprises:
predicting a future geographic location for the business based on the set of past geographic locations for the business.

9. The system of claim 1, wherein the transaction record comprises a record of a redemption of a promotional offer.

10. The system of claim 1, wherein the processing hardware is further configured to receive the one or more transaction records from a transaction data repository.

11. The system of claim 1, wherein the processing hardware is further configured to receive the one or more transaction records from a plurality of mobile devices, each mobile device used to carry out a transaction.

12. The system of claim 11, wherein the processing hardware is further configured to filter personal identifiable information from the one or more transaction records received from the plurality of mobile devices.

13. A computer-implemented method for updating geographic data based on a transaction, the method comprising:
- accessing, from a data repository, one or more transaction records, each transaction record identifying a transaction time, geographic location data, and transaction information;
- identifying a cluster of transaction records having geographic location data corresponding to a particular geographic area;
- creating a geocoded record of a business based on the cluster; and
- using at least one of the transaction time or the transaction information identified in the transaction records to populate the created geocoded record.

14. The method of claim 13, wherein the particular geographic area is defined by a center point and a predetermined radius.

15. A computer-readable medium comprising instructions which, when executed by one or more computers cause the one or more computers to implement a method, the method comprising:
- receiving a transaction record, the transaction record identifying a transaction time, geographic location data, and transaction information;
- associating the transaction record with a geocoded record stored in a geographic data repository based on the geographic location data in the transaction record; and
- updating the geocoded record based on at least one of the transaction time or the transaction information.

16. The computer-readable medium of claim 15, wherein the method further comprises:
- removing personal identifiable information from the received transaction record.

17. The computer-readable medium of claim 15, wherein the geocoded record is associated with a business.

18. The computer-readable medium of claim 17, wherein updating the geocoded record comprises:
- determining an address of the business based on payment information associated with the transaction record, and
- updating the geocoded record to include the address of the business or to correct an existing address of the business previously in the geocoded record.

19. The computer-readable medium of claim 15, wherein the transaction record comprises a purchase record.

20. The computer-readable medium of claim 15, wherein the transaction record comprises a record of a use of a coupon.

* * * * *